UNITED STATES PATENT OFFICE.

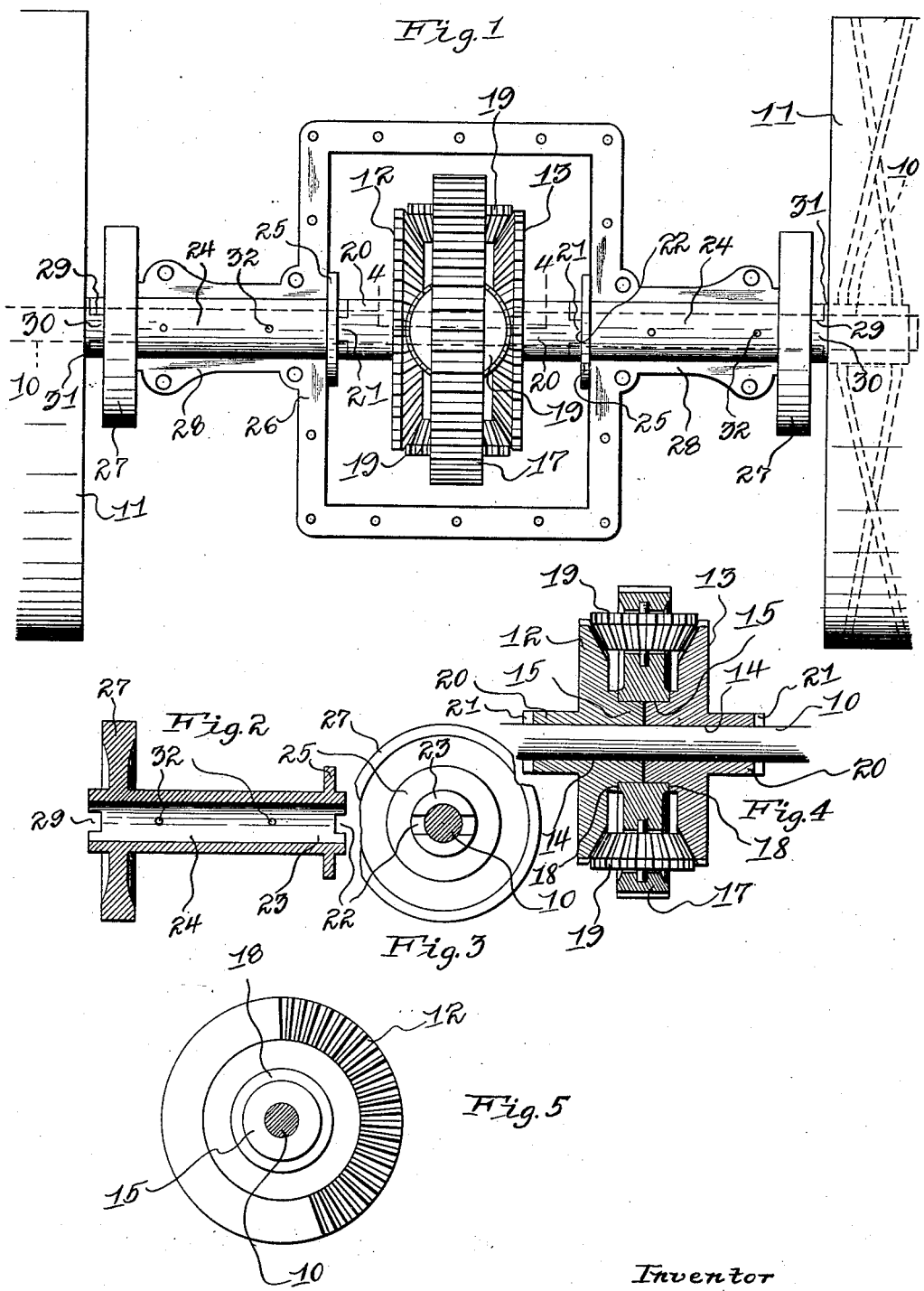

CHARLES WILLIAM LATHAM, OF CALEDONIA, MINNESOTA.

DIFFERENTIAL DRIVE MECHANISM.

1,316,248.    Specification of Letters Patent.    Patented Sept. 16, 1919.

Application filed January 19, 1918. Serial No. 212,576.

*To all whom it may concern:*

Be it known that I, CHARLES WILLIAM LATHAM, a citizen of the United States, residing at Caledonia, in the county of Houston and State of Minnesota, have invented new and useful Improvements in Differential Drive Mechanism, of which the following is a specification.

One object of my invention is to provide a construction wherein the differential gear is mounted upon a continuous axle having a drive wheel at each end and to transmit power directly from such a differential gear to the hub of each drive wheel.

A further object is to dispense with countershaft, jack-shaft, and their pinions, and to provide an economical, efficient and easily assembled cylindrical drive shaft mounted upon a continuous axle.

A further object is to provide such a drive shaft positively engaging a concentric differential gear and a drive wheel hub, which are secure against end thrust.

These and other objects will more fully hereinafter appear in the specification and claims.

In the accompanying drawings, Figure 1 is a top plan view of my construction; Fig. 2 is a central longitudinal section of my hollow cylindrical drive shaft; Fig. 3 is an end view thereof; Fig. 4 is a central section on the line 4—4 of Fig. 1; and Fig. 5 is an end view of one of the beveled gears.

In the drawings, I have used the reference numeral 10 to indicate a continuous axle, upon each end of which is journaled a drive wheel 11. Two beveled gears 12 and 13, each having a central bore 14 therein, are placed face to face about the middle of said axle 10 and are independently revoluble thereon. The hubs of said gears 12 and 13 project toward their adjacent faces and form annular bosses 15, which tend to space the gears 12 and 13 apart and serve as a bearing upon which a differential master gear wheel 17 is freely journaled, while the hubs on the outer faces of said beveled gears 12 and 13 are extended to form axial sleeves 20, with a pair of lugs 21 on the end of each sleeve. Annular shoulders 18 at the bases of said bosses 15, bear against the sides of said master gear 17 and retain said gear in position. A plurality of beveled differential pinions 19 are journaled transversely in said gear 17, and each engages simultaneously the teeth of both beveled gears 12 and 13. The lugs 21 on each sleeve 20 enter grooves 22 formed in the ends 23 of a pair of hollow cylindrical driving shafts 24. Said shafts freely receive the axle 10 and each is formed at its end 23 with an integral circumferential flange 25. Said flange 25 bears against the inner surface of a housing 26 for the differential gear. At the other end of, and integral with, each shaft 24 is formed a brake wheel 27. A journal boxing 28, in which said shaft 24 revolves, abuts against the brake wheel 27 and also against the flange 25. Said flange 25 and brake wheel 27, by reason of their location at opposite ends of the boxing 28, prevent longitudinal movement of said shaft 24. The end of each shaft 24, adjacent to the drive wheel 11, has a pair of opposite grooves 29 formed therein, (similar to the grooves 22) which interlock with a pair of lugs 30, formed integral with the hub 31 of said drive wheels 11. Oil holes 32 are formed in said cylindrical drive shaft 24, to permit lubrication of the axle 10 passing therethrough.

When power is applied from an engine or other source to turn the master gear 17, the beveled gears 12 and 13 are also revolved, by reason of their engagement with the differential pinions 19 of said master gear. Rotation is also communicated to the drive shaft 24 through the engagement of lugs 21, of the beveled gears 12 and 13, with grooves 22 of said drive shafts. The engagement of grooves 29, in the drive shafts 24, and lugs 30 of the wheel hubs, likewise causes the power wheels 11 to be driven.

The revoluble mounting of the differential gearing, drive shafts and drive wheels upon a continuous axle insures a strong, compact and durable construction, and the method of interlocking the drive shafts with the differential gear and wheel hubs eliminates bolts or similar fastening means, and promotes ease in making repairs, as well as increases economy in construction.

Having described my invention, what I claim as new and desire to protect by Letters Patent is:

1. A drive mechanism comprising an axle, a power wheel journaled at each end of said axle, a hub on said wheel formed with lugs on its inner end, a hollow cylindrical drive shaft at each end of said axle having grooves interlocking with said lugs, a brake wheel on the outer end of each of said drive shafts, said drive shafts being formed with a flange on their inner ends so that said brake wheel and flange may co-act with a journal boxing to prevent end thrust, a differential gear revolubly mounted upon the central portion of said axle, and driving means on said drive shafts positively engaging said differential gear.

2. A driving mechanism having a differential gearing, driving wheels formed with inwardly extending hubs, hollow driving shafts engaging the hubs of said driving wheels at the ends of said shafts, an axle upon which said differential gearing, driving wheels and hollow shafts are revolubly mounted, a housing for said differential gearing, journal bearings extending from said housing for said hollow driving shafts, a brake wheel formed integral with one end of each of said hollow shafts and each of said hollow shafts having a flange on its inner end, said brake wheel and flange engaging the outer end of said journal bearings and the inner surface of said housing, respectively, to hold said hollow shafts against longitudinal movement for the purposes specified.

Whereof, I have hereunto subscribed my name to this specification.

CHARLES WILLIAM LATHAM.

Copies of this patent may be obtained for five cents each, by addressing the "Commissioner of Patents, Washington, D. C."